US007019505B2

(12) United States Patent
Dwarakanath et al.

(10) Patent No.: US 7,019,505 B2
(45) Date of Patent: Mar. 28, 2006

(54) DIGITAL CONTROLLER FOR A POWER CONVERTER EMPLOYING SELECTABLE PHASES OF A CLOCK SIGNAL

(75) Inventors: Mirmira Ramarao Dwarakanath, Somerset, NJ (US); Jue Wang, Union, NJ (US)

(73) Assignee: Enpirion, Inc., Bridgewater, NJ (US)

( * ) Notice: Subject to any disclaimer, the term of this patent is extended or adjusted under 35 U.S.C. 154(b) by 0 days.

(21) Appl. No.: 10/766,983

(22) Filed: Jan. 29, 2004

(65) Prior Publication Data

US 2005/0168205 A1    Aug. 4, 2005

(51) Int. Cl.
    G05F 1/40    (2006.01)
(52) U.S. Cl. ..................................... 323/283
(58) Field of Classification Search ............... 323/283, 323/282; 327/165, 176, 175
    See application file for complete search history.

(56) References Cited

U.S. PATENT DOCUMENTS

| | | | |
|---|---|---|---|
| 4,761,725 A | | 8/1988 | Henze |
| 4,982,353 A | | 1/1991 | Jacob et al. |
| 5,285,369 A | | 2/1994 | Balakrishnan |
| 5,469,334 A | | 11/1995 | Balakrishnan |
| 5,594,324 A | | 1/1997 | Canter et al. |
| 5,689,213 A | * | 11/1997 | Sher ............................ 331/57 |
| 6,005,377 A | | 12/1999 | Chen et al. |
| 6,118,351 A | | 9/2000 | Kossives et al. |
| 6,255,714 B1 | | 7/2001 | Kossives et al. |
| 6,495,019 B1 | | 12/2002 | Filas et al. |
| 6,541,819 B1 | | 4/2003 | Lotfi et al. |
| 6,791,305 B1 | * | 9/2004 | Imai et al. .................. 323/283 |

OTHER PUBLICATIONS

Betancourt-Zamora, R.J. et al., "A 1.5 mW, 200 MHz CMOS VCO for Wireless Biotelemetry," First International Workshop on Design of Mixed-Mode Integrated Circuits and Applications, Cancun, Mexico, pp. 72-74, Jul., 1997.
Goodman, J. et al., "An Energy/Security Scalable Encryption Processor Using an Embedded Variable Votlage DC/DC Converter," IEEE Journal of Solid-State Circuits, vol. 33, No. 11 (Nov. 1998).
Horowitz, P., et al., "The Art of Electronics," Second Edition, 1989, pp. 288-291, Cambridge University Press, Cambridge, MA.
Lotfi, A.W., et al., "Issues and Advances in High-Frequency Magnetics for Switching Power Supplies," Proceedings of the IEEE, Jun. 2001, vol. 89, No. 6, pp. 833-845.

* cited by examiner

*Primary Examiner*—Shawn Riley
(74) *Attorney, Agent, or Firm*—Slater & Matsil, L.L.P.

(57) ABSTRACT

A controller for, related method of controlling a switch of, a power converter, and a power converter employing same. The controller is employable with a power train of a power converter including a switch configured to conduct for a duty cycle and provide a regulated output characteristic at an output thereof. In one embodiment, the controller includes an oscillator configured to provide a clock signal having multiple phases. The controller also includes a modulator configured to select a phase of the clock signal as a function of a portion of a digital duty cycle signal to refine a resolution of the duty cycle and provide a signal to control the duty cycle of the switch as a function of the digital duty cycle signal.

20 Claims, 4 Drawing Sheets

US 7,019,505 B2

DIGITAL CONTROLLER FOR A POWER CONVERTER EMPLOYING SELECTABLE PHASES OF A CLOCK SIGNAL

TECHNICAL FIELD

The present invention is directed, in general, to power electronics and, more specifically, to a controller for a power converter, method of controlling a duty cycle of a switch of the power converter, and a power converter employing the same.

BACKGROUND

A switch mode power converter (also referred to as a "power converter") is a power supply or power processing circuit that converts an input voltage waveform into a specified output voltage waveform. Controllers associated with the power converters manage an operation thereof by controlling the conduction periods of switches employed therein. Generally, the controllers are coupled between an input and output of the power converter in a feedback loop configuration (also referred to as a "control loop" or "closed control loop").

Typically, the controller measures an output characteristic (e.g., an output voltage) of the power converter and based thereon modifies a duty cycle of the switches of the power converter. The duty cycle is a ratio represented by a conduction period of a switch to a switching period thereof. Thus, if a switch conducts for half of the switching period, the duty cycle for the switch would be 0.5 (or 50 percent). Additionally, as the needs for systems such as a microprocessor powered by the power converter dynamically change (e.g., as a computational load on the microprocessor changes), the controller should be configured to dynamically increase or decrease the duty cycle of the switches therein to maintain the output characteristic at a desired value.

For the most part, controllers associated with the power converters have primarily been composed of interconnected analog circuits. Analog circuitry, however, is undesirable for numerous reasons as set forth below. First, analog controllers can require a multitude of interconnected discrete components to obtain a desired functionality of a single controller, which translates into large inventory costs, and more complicated and expensive manufacturing processes. The analog controllers also tend to take up a fairly extensive footprint of the power converters to accommodate the numerous discrete components therein. With a trend toward smaller power converters that parallels an increased level of integration with the loads powered thereby, employing a larger footprint for the controller necessitated by the numerous discrete components that are not easily reduced in size by circuit integration is disadvantageous.

Additionally, analog hardware is generally fixed and inflexible thereby making modifications thereto very difficult, if not impossible, without a complete redesign of the controller. Analog circuitry is also subject to packaging and component defects, especially as the number of components increases, and analog circuitry tends to be sensitive to noise leading to further defects therein. As is evident from the foregoing, analog controllers suffer from several drawbacks that inhibit the effectiveness thereof. Despite the numerous limitations of analog circuitry, however, the analog controllers have been the controllers of choice for use with a majority of commercially available power converters today.

Looking at the alternatives to analog controllers, controllers employing digital circuitry have been successfully employed in lieu of analog controllers in power converters servicing lower speed or slower response applications (e.g., response times in a range of two to 100 milliseconds) such as uninterruptible power supplies, motor drives and three-phase rectifiers. The controllers employing digital circuitry that control power converters servicing such applications can generally execute the necessary commands in an allotted amount of time consistent with the respective application.

To date, however, controllers employing digital circuitry for use with power converters powering sensitive loads such as high performance microprocessors have not been viable alternatives to analog controllers due, in part, to a necessity for faster control loops and tighter budgetary constraints. A typical commercial AC-to-DC or DC-to-DC power converter demands response times of approximately 20 microseconds or less with closed control loop bandwidth requirements in a range of five to 100 kilohertz. The controllers for the power converters should also account for sampling within a switching cycle, which is typically two orders of magnitude faster than the lower speed applications mentioned above. The fast response times are presently attainable by controllers employing analog circuitry. Cost effective digital signal processors are generally not capable of meeting the wide bandwidth requirements in the control loops to meet the fast transient response times and high switching frequencies of the power converters.

Moreover, overcoming the aforementioned limitations may induce cost prohibitive processor designs, when compared to the cost of analog controllers. For instance, a 60 watt DC-to-DC power converter with analog control circuitry may cost around $35, whereas the cost of a digital signal processor alone for the power converter may cost around $15, which is a substantial cost for the control function by itself. A controller incorporating a high performance digital signal processor has, in the past, been too expensive for use with the power converters when compared to the lower cost analog controller.

It is recognized that a significant contributor to a complexity of digital processing and the related computational delays in the digital processing of control signals is a substitution of digital circuitry in the controller for corresponding analog processes. An example of such a substitution is sensing and converting an analog signal such as the output characteristic (e.g., the output voltage) with sufficient accuracy and speed into a digital format for use with the digital circuitry in the controller. The inverse process of a digital to analog conversion is less complex and, often times, can be performed expeditiously with an "R-2R" resistor ladder and an operational amplifier. The process of analog to digital conversion, however, generally uses techniques such as "successive approximation" that employ a significant amount of time for iterative processing. The process of analog to digital conversion may also use "flash conversions" that employ significant circuitry to perform the necessary tasks in an acceptable time period, or ramp generators and counters that take a significant amount of time to perform the conversion function. The aforementioned complexities all contribute either individually or in combination to the complexity of the controller employing digital circuitry.

Another significant contributor to a complexity of digital processing and the related computational delays in the digital processing of control signals is the signal processing necessary to produce a duty cycle for the switches of the power converter after the input signals are converted into a digital format. This process is frequently performed with a microprocessor or a digital signal processor. Again, either circuit complexity with attendant cost for high performance circuitry or the computational delays of lower performance circuitry is a consequence of substituting digital processing for otherwise conventional analog processes.

The use of controllers employing digital circuitry in power supplies has been the subject of many references including U.S. Pat. No. 6,005,377 entitled "Programmable Digital Controller for Switch Mode Power Conversion and Power Supply Employing the Same," to Chen, et al. ("Chen"), issued Dec. 21, 1999, which is incorporated herein by reference. Chen discloses a programmable controller that operates in a digital domain without reliance on operational software or internal analog circuitry to control a switch of a power converter. In an exemplary embodiment, the controller is embodied in a field programmable gate array with the ability to handle numerous functions simultaneously and in parallel, as opposed to a digital signal processor which handles instructions serially. Thus, the controllers of Chen can handle bandwidths greater than or equivalent to analog controllers in the range of five to 100 kilohertz. (Column 2, lines 43–57).

Even in view of Chen and other references, the increased switching frequency of the power converter with a continual improvement in circuit technology and the need to maintain a regulated output characteristic is a challenge for the application of controllers employing digital circuitry. The combination of increasing the switching frequency and maintaining a well regulated output characteristic often necessitates the use of higher frequency oscillators within the power converter. The higher frequency oscillators provide clock signals to drive, for instance, the digital-to-analog conversion process employable to translate a digital word representing a duty cycle of the power converter into a time-based signal that can control the switching characteristic of the switches thereof.

For example, if a power converter with a switching frequency of five megahertz is well suited to regulate an output characteristic within a one percent margin of error, then a maximum time resolution for the duty cycle can be estimated as the product of 200 nanoseconds (which is the switching period equivalent to five megahertz), times 50 percent (which is an assumed nominal duty cycle for the switches of the power converter), times one percent (which is the margin of error). The resulting product is one nanosecond, which represents a period for a one gigahertz oscillator that would be necessary to generate clock signals to enable the digital-to-analog conversion process referred to above. One gigahertz oscillators are difficult to implement with ordinary silicon components. In addition, higher frequency oscillators (such as a one gigahertz oscillator) generate substantial heat related to parasitic power loss in the course of rapidly charging and discharging parasitic circuit capacitance as well as incurring switching losses associated with the active elements in the power converter. Power converters operable with oscillator frequencies that are less (e.g., an order of magnitude less) have substantial benefits in cost as well as operating efficiency.

Attempts have been made to make greater utilization of analog circuitry in the digital-to-analog conversion process to avoid the use of an oscillator with the higher frequencies as described above. One alternative is to use an "R-2R" resistor divider to convert the digital word representing duty cycle into an analog format and then use the familiar analog processes employing a periodic ramp and comparator to generate the time-based duty cycle signal. The footprint required for a resistor divider, and a current source and capacitor to generate the periodic ramp have rendered this approach impractical in certain applications such as in systems employing low cost and compact integrated circuits with relatively fine line, digital silicon technology.

As mentioned above, while there has been considerable attention and some improvement in controllers employing digital circuitry (see, for instance, Chen mentioned above) for use with the power converters, there is still an opportunity for improvement in the controllers, especially in view of the more stringent demands on the power converters and the increased switching frequencies thereof. Accordingly, what is needed in the art is a controller for the power converters, and a method of operation thereof, that takes advantage of the benefits associated with digital control circuitry, while overcoming circuit complexities or the need for a higher frequency oscillator (e.g., a one gigahertz oscillator for a power converter with a switching frequency of five megahertz) in the processing of the signals that have disadvantageously affected controllers employing digital circuitry in the past. In accordance therewith, what is needed in the art is a controller that can efficiently produce a duty cycle for the switches of the power converter to maintain an output characteristic at about a desired value without employing a higher frequency oscillator as described above and, at the same time, meet the more exacting demands imposed on the power converters.

SUMMARY OF THE INVENTION

These and other problems are generally solved or circumvented, and technical advantages are generally achieved, by advantageous embodiments of the present invention which includes a controller for use with a power train of a power converter including a switch configured to conduct for a duty cycle and provide a regulated output characteristic at an output thereof. In one embodiment, the controller includes an oscillator configured to provide a clock signal having multiple phases. The controller also includes a modulator configured to select a phase of the clock signal as a function of a portion of a digital duty cycle signal to refine a resolution of the duty cycle and provide a signal to control the duty cycle of the switch as a function of the digital duty cycle signal.

As an example, the digital duty cycle signal may include least and most significant bits. Under such circumstances, the modulator may be configured to select a phase of the clock signal as a function of the least significant bits of the digital duty cycle signal to refine the resolution of the duty cycle. The modulator may also be configured to provide the signal to control the duty cycle of the switch as a function of the least and most significant bits of the digital duty cycle signal.

In another aspect, the present invention provides a method of controlling a duty cycle of a switch of a power train of a power converter that includes providing a clock signal having multiple phases and furnishing a digital duty cycle signal. The method may also include selecting a phase of the clock signal as a function of a portion of the digital duty cycle signal to refine a resolution of the duty cycle and supplying a signal to control the duty cycle of the switch as a function of the digital duty cycle signal. In a related example, the digital duty cycle signal may include least and most significant bits. In accordance with the act of supplying, the method may employ trailing edge modulation of the digital duty cycle signal in accordance with the least and most significant bits to derive the signal to control the duty cycle of the switch.

In yet another aspect, the present invention provides a power converter including a power train with a switch configured to conduct for a duty cycle and provide a regulated output characteristic at an output of the power converter. The power converter also includes a controller having a ring oscillator configured to provide a clock signal having multiple phases and a duty cycle processor configured to provide a digital duty cycle signal. The controller also includes a modulator configured to select a phase of the clock signal as a function of a portion of the digital duty cycle signal to refine a resolution of the duty cycle and provide a signal to control the duty cycle of the switch as a function of the digital duty cycle signal. The power converter also includes a driver configured to provide a drive signal to the switch based on the signal provided by the modulator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely, a controller for a power converter, method of operation thereof and a power converter employing the same. The principles of the present invention, however, may also be applied to all types of power supplies employing various conversion topologies that may benefit from a controller employing digital circuitry. The advantages associated with the controller and power converters further exploit the benefits associated with the application of digital systems in electronic devices.

Figure 1:
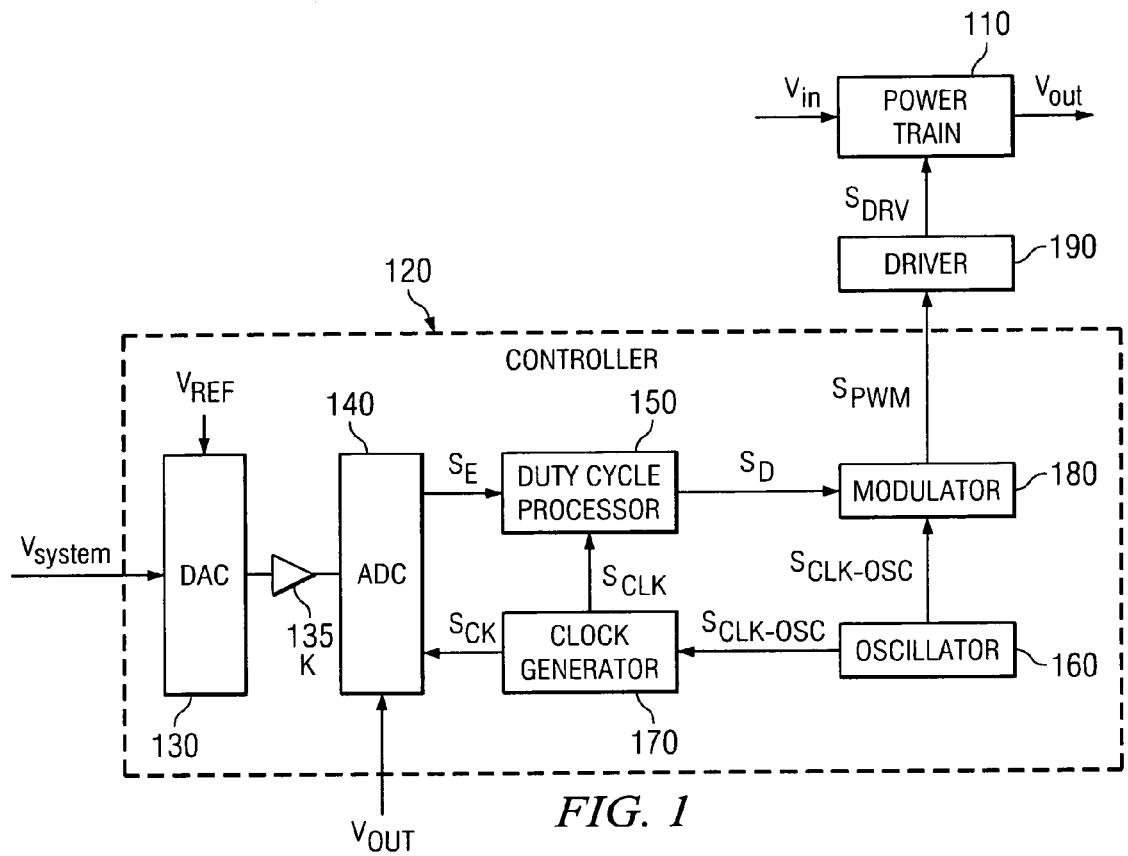
FIG. 1 illustrates a block diagram of an embodiment of a power converter constructed according to the principles of the present invention.

Referring initially to FIG. 1, illustrated is a block diagram of an embodiment of a power converter constructed according to the principles of the present invention. The power converter includes a power train 110, a controller 120 and a driver 190, and provides power to a system such as a microprocessor. The power train 110 may employ a buck converter topology as illustrated and described with respect to FIG. 2 below. Of course, any number of converter topologies may benefit from the use of a controller 120 constructed according to the principles of the present invention and are well within the broad scope of the present invention.

The power train 110 receives an input voltage $V_{in}$ at an input thereof as a power source and provides a regulated output characteristic (e.g., an output voltage) $V_{out}$ to power a microprocessor or other load coupled to an output of the power converter. The controller 120 receives a digital word representing a desired characteristic such as a desired system voltage $V_{system}$ from an internal or external source associated with the microprocessor, and the output voltage $V_{out}$ of the power converter. In accordance with the aforementioned characteristics, the controller 120 provides a signal to control a duty cycle and a frequency of at least one switch of the power train 110 to regulate the output voltage $V_{out}$ thereof.

The controller 120 includes a digital-to-analog converter ("DAC") 130 that receives a reference voltage $V_{REF}$ and transforms the desired system voltage $V_{system}$ in the form of a digital word or format into an analog equivalent (i.e., an analog format). The reference voltage $V_{REF}$ provides a reference for a calibration of the digital-to-analog conversion process associated with the DAC 130. The analog format of the desired system voltage $V_{system}$ is then amplified with a gain K, if necessary, by an operational amplifier 135. A sparse analog-to-digital converter ("ADC") 140 of the controller 120 employs the analog format of the desired system voltage $V_{system}$ and the output voltage $V_{out}$ to provide an error signal $S_E$ to a duty cycle processor 150. The error signal $S_E$ typically is in the form of a series of binary error signals and represents a difference between the output voltage $V_{out}$ of the power converter and the desired system voltage $V_{system}$ in discrete steps. In an advantageous embodiment, a magnitude of the discrete steps of the error signal $S_E$ is small when the difference is small and a magnitude of the discrete steps of the error signal $S_E$ is larger when the difference is larger.

Thus, the sparse ADC 140 detenrires a difference between the output voltage $V_{out}$ and the desired system voltage $V_{system}$ and provides the error signal $S_E$ therefrom. The duty cycle processor 150 then employs the error signal $S_E$ to provide a digital duty cycle signal $S_D$ (e.g., a four or an eight bit digital signal representing a duty cycle) to control a duty cycle of at least one switch of the power converter. An embodiment of a sparse ADC 140 and duty cycle processor 150 are disclosed in U.S. Patent Application Publication No. 2005/016902, entitled "Controller for a Power Converter and a Method of Controlling a Switch Thereof," to Dwarakanath, et al., which is incorporated herein by reference.

The duty cycle processor 150 is coupled to a modulator 180 [e.g., a pulse width modulator ("PWM")] that converts the digital duty cycle signal $S_D$ from the duty cycle processor 150 into a signal so that the driver 190 (e.g., a gate driver) can control at least one switch of the power converter. An operation of the duty cycle processor 150 is gated by a clock signal $S_{CLK}$ provided by a clock generator 170. The clock generator 170 also provides another clock signal $S_{CK}$ for the sparse ADC 140, which may be shifted in phase as compared to the clock signal $S_{CLK}$ for the duty cycle processor 150. A frequency of the clock signals $S_{CLK}$, $S_{CK}$ may be on the order of one thirty-second or one eighth of the switching frequency of the power converter.

The switching frequency of the modulator 180 is typically the same as the switching frequency of the power converter and is controlled by an oscillator (e.g., a ring oscillator) 160. The ring oscillator 160 also provides a high frequency clock signal $S_{CLK\text{-}OSC}$ to the clock generator 170, which is divided down to produce the clock signals $S_{CLK}$, $S_{CK}$. The clock signal $S_{CLK\text{-}OSC}$ from the ring oscillator 160 may be embodied in multiple phases for reasons as set forth below. In accordance with the aforementioned characteristics, a drive signal(s) $S_{DRV}$ is provided by the driver 190 to control a duty cycle and a frequency of at least one switch of the power converter to regulate the output voltage $V_{out}$ thereof.

The modulator 180 often includes a digital counter that is clocked by the ring oscillator 160. The modulator 180 reads the digital duty cycle signal $S_D$ from the duty cycle processor 150 and generates a high signal during a portion of the counting cycle that corresponds to a period when a switch of the power converter is being controlled to conduct, and a low signal otherwise. At the end of the counting cycle, the counter resets to zero. The ring oscillator 160 generates a clock signal $S_{CLK\text{-}OSC}$ that can facilitate fine duty cycle granularity or resolution by the modulator 180 thereby allowing accurate control, as necessary, of the output voltage $V_{out}$ of the power converter. Thus, the modulator 180 supplies a signal that is typically constructed to form a pulse width modulated signal $S_{PWM}$ to control the duty cycle for at least one switch of the power converter. The pulse width modulated signal $S_{PWM}$ is then fed to the driver 190.

There are a number of viable alternatives to implement a driver 190 that include techniques to provide sufficient signal delays to prevent crosscurrents when controlling multiple switches in the power converter. Of course, any driver 190 capable of providing a drive signal $S_{DRV}$ to control a switch is well within the broad scope of the present invention. Additionally, an embodiment of a driver is disclosed in U.S. Patent Application Publication No. 2005/0168203, entitled "Driver for a Power Converter and Method of Driving a Switch Thereofm " to Dwarakanath, et al., which is incorporated herein by reference.

Figure 2:
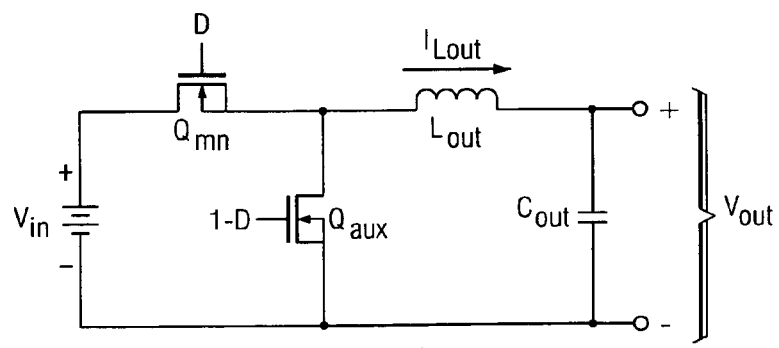
FIG. 2 illustrates a schematic diagram of an embodiment of a power train of a power converter constructed according to the principles of the present invention.

Turning now to FIG. 2, illustrated is a schematic diagram of an embodiment of a power train of a power converter constructed according to the principles of the present invention. While in the illustrated embodiment, the power train employs a buck converter topology, those skilled in the art should understand that other converter topologies such as a forward converter topology are well within the broad scope of the present invention.

The power train of the power converter receives an input voltage $V_{in}$ from a source of electrical power (represented by a battery) at an input thereof and provides a regulated output voltage $V_{out}$ to power, for instance, a microprocessor at an output of the power converter. In keeping with the principles of a buck converter topology, the output voltage $V_{out}$ is generally less than the input voltage $V_{in}$ such that a switching operation of the power converter can regulate the output voltage $V_{out}$. A main switch $Q_{mn}$ (e.g., a field effect transistor) is enabled to conduct for a primary interval (generally co-existent with a primary duty cycle "D" of the main switch $Q_{mn}$) and couples the input voltage $V_{in}$ to an output filter inductor $L_{out}$. During the primary interval, an inductor current $I_{Lout}$ flowing through the output filter inductor $L_{out}$, increases as a current flows from the input to the output of the power train. An AC component of the inductor current $I_{Lout}$ is filtered by the output capacitor $C_{out}$.

During a complementary interval (generally co-existent with a complementary duty cycle "1-D" of the main switch $Q_{mn}$), the main switch $Q_{mn}$ is transitioned to a non-conducting state and an auxiliary switch $Q_{aux}$ (e.g., a freewheeling field effect transistor or freewheeling diode) is enabled to conduct. The auxiliary switch $Q_{aux}$ provides a path to maintain a continuity of the inductor current $I_{Lout}$ flowing through the output filter inductor $L_{out}$. During the complementary interval, the inductor current ILout through the output filter inductor $L_{out}$, decreases. In general, the duty cycle of the main and auxiliary switches $Q_{mn}$, $Q_{aux}$ may be adjusted to maintain a regulation of the output voltage $V_{out}$ of the power converter. Those skilled in the art should understand, however, that the conduction periods for the main and auxiliary switches $Q_{mn}$, $Q_{aux}$ may be separated by a small time interval to avoid cross conduction therebetween and beneficially to reduce the switching losses associated with the power converter.

As mentioned above, as the needs for the systems such as a microprocessor powered by the power converter dynamically change, a controller should be configured to dynamically increase or decrease the duty cycle of the main and auxiliary switches $Q_{mn}$, $Q_{aux}$ therein to maintain an output characteristic such as the output voltage $V_{out}$ at a desired value. The controller constructed according to the principles of the present invention can maintain a well regulated output voltage $V_{out}$, even in view of an increase in demand on the systems such as microprocessors powered by the power converter.

Figure 3:
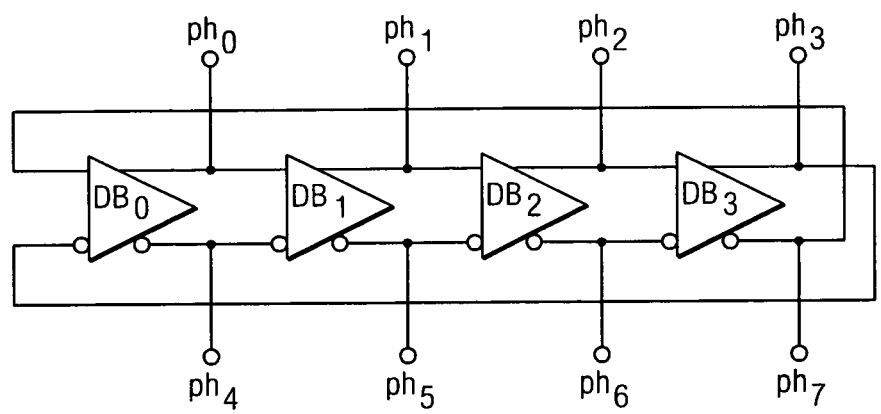
FIG. 3 illustrates a block diagram of portions of a controller including an embodiment of an oscillator constructed according to the principles of the present invention.

Turning now to FIG. 3, illustrated is a block diagram of portions of a controller including an embodiment of an oscillator (e.g., a ring oscillator) constructed according to the principles of the present invention. While the illustrated embodiment discloses a ring oscillator, those skilled in the art should understand that other oscillators capable of providing multiple phases of a clock signal may be employed and still be within the broad scope of the present invention. The ring oscillator includes a plurality of differential buffers, namely, a first, second, third and fourth differential buffer $DB_0$, $DB_1$, $DB_2$, $DB_3$ coupled in a closed loop configuration. Of course, the ring oscillator may include a fewer or larger number of differential buffers and still be within the broad scope of the present invention.

Figure 4A:
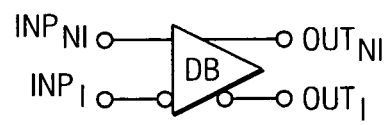
FIG. 4A illustrates a block diagram of a symbolic representation of a differential buffer employable with an oscillator in accordance with the principles of the present invention.
Figure 4B:
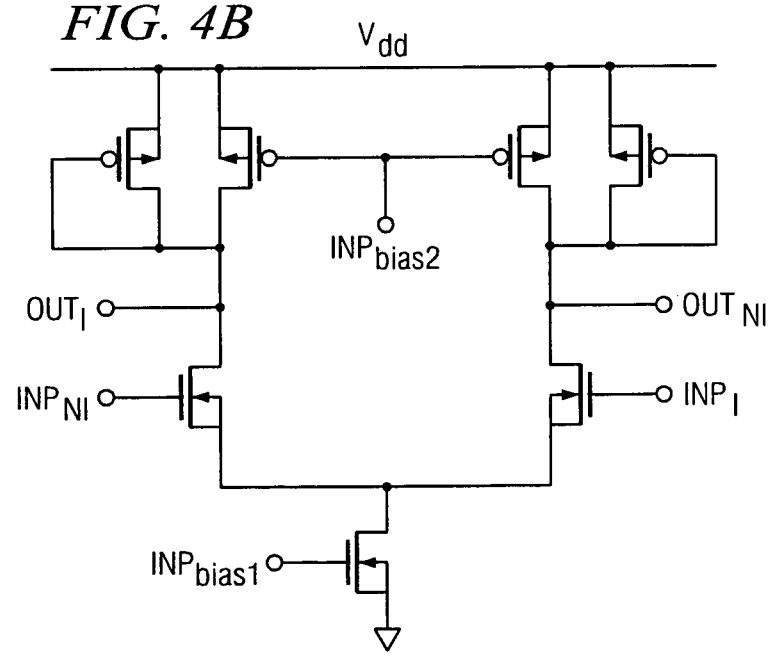
FIG. 4B illustrates a schematic diagram of an embodiment of a differential buffer employable with an oscillator in accordance with the principles of the present invention.

With continuing reference to FIG. 3, FIGS. 4A and 4B illustrate diagrams of embodiments of a differential buffer in accordance with the principles of the present invention. More specifically, FIG. 4A illustrates a block diagram of a symbolic representation of a differential buffer DB in accordance with the principles of the present invention. The differential buffer DB includes non-inverting and inverting inputs $INPN_{NI}$, $INP_I$ for receiving input signals (e.g., input voltages). The differential buffer DB also includes non-inverting and inverting outputs $OUT_{NI}$, $OUT_I$ for providing output signals (e.g., output voltages).

Turning now to FIG. 4B, illustrated is a schematic diagram of an embodiment of a differential buffer in accordance with the principles of the present invention. The differential buffer is a symmetric circuit including a plurality of switches [e.g., N-channel and P-channel metal oxide semiconductor field effect transistors ("MOSFETs")] coupled between a positive bias voltage source $V_{dd}$ (which may be provided by an internal or external source) and ground. The differential buffer includes non-inverting and inverting inputs $INP_{NI}$, $INP_I$, for receiving input signals (e.g., input voltages). The differential buffer DB also includes non-inverting and inverting outputs $OUT_{NI}$, $OUT_I$ for providing output signals (e.g., output voltages).

The differential buffer is adjusted for delays in response to changes in the state of the input signals by first and second bias voltages (which may be internally or externally generated) coupled to first and second bias inputs $INP_{bias1}$, $INP_{bias2}$, respectively. When high and low input signals are present on the non-inverting and inverting inputs $INP_{NI}$, $INP_I$, respectively, then, after a brief delay, the non-inverting and inverting outputs $OUT_{NI}$, $OUT_I$, provide high and low output signals, respectively. Conversely, when the states of the input signals are reversed, the states of the output signals are also reversed. Thus, a differential buffer can be configured to regenerate state switching input signals at the outputs thereof with a brief delay. Circuits employable to implement differential buffers are generally well known in the art as described, for instance, in "A 1.5 mW, 200 MHz CMOS VCO for Wireless Biotelemetry", by R. J. Betancourt-Zamora, et al., First International Workshop on Design of Mixed-Mode Integrated Circuits and Applications, Cancun, Mexico, pp. 72–74, July, 1997, which is incorporated herein by reference.

Returning now to FIG. 3, the bias voltages coupled to the differential buffers $DB_0$, $DB_1$, $DB_2$, $DB_3$ to adjust circuit delays are omitted for simplicity. In the illustrated embodiment, the non-inverting output of each of the differential buffers $DB_0$, $DB_1$, $DB_2$, $DB_3$ is coupled to a non-inverting input of another differential buffer $DB_0$, $DB_1$, $DB_2$, $DB_3$. The inverting output from the fourth differential buffer $DB_3$ is coupled to the non-inverting input of the first differential buffer $DB_0$ such that the necessary phase inversion can be provided to sustain oscillation.

It should be understood by those skilled in the art, however, that the differential buffers $DB_0$, $DB_1$, $DB_2$, $DB_3$ may be configured in alternative arrangements to derive the ring oscillator. For example, if two additional cross-coupled connections are provided between the differential buffers $DB_0$, $DB_1$, $DB_2$, $DB_3$ of the ring oscillator illustrated in FIG. 3, an overall operation of the circuit is substantially unaffected. Ring oscillators can also be configured with asymmetric, inverting differential buffers and additional differential buffers can be added to provide additional phases.

The ring oscillator generally operates as set forth below. Assume, for instance, the non-inverting outputs of the differential buffers $DB_0$, $DB_1$, $DB_2$, $DB_3$ are initially in a high state. The inverting output of the fourth differential buffer $DB_3$ is coupled to the non-inverting input of the first differential buffer $DB_0$. Thus, when the input signal to the non-inverting input of the first differential buffer $DB_0$ is driven to a low state, after a brief delay, the output signal provided by the non-inverting output is also driven to a low state. Similarly and after a brief delay, the output signal provided by the non-inverting output of the second differential buffer $DB_1$ is driven to a low state and then, after a further brief delay, the output signal provided by the non-inverting output of the third differential buffer $DB_2$ is driven to a low state. Finally and after a further brief delay, the output signal provided by the non-inverting output of the fourth differential buffer $DB_3$ is driven to a low state.

As a result, the input signal provided to the non-inverting input of the first differential buffer $DB_0$ is driven to a high state, which continues the process thereby sustaining oscillation of the ring oscillator. The first through the eighth phases $ph_0$, $ph_1$, $ph_2$, . . . $ph_7$ from the ring oscillator form phases of a clock signal (see, for instance, the clock signal $S_{CLK-OSC}$ illustrated and described with respect to FIG. 1) and may be coupled to a digitally controlled multiplexer as further described below. Thus, the ring oscillator can be constructed using differential buffers $DB_0$, $DB_1$, $DB_2$, $DB_3$ to provide multiple phases $ph_0$, $ph_1$, $ph_2$, . . . $ph_7$ of a clock signal that can be selectively coupled to a modulator as hereinafter described.

Figure 5:
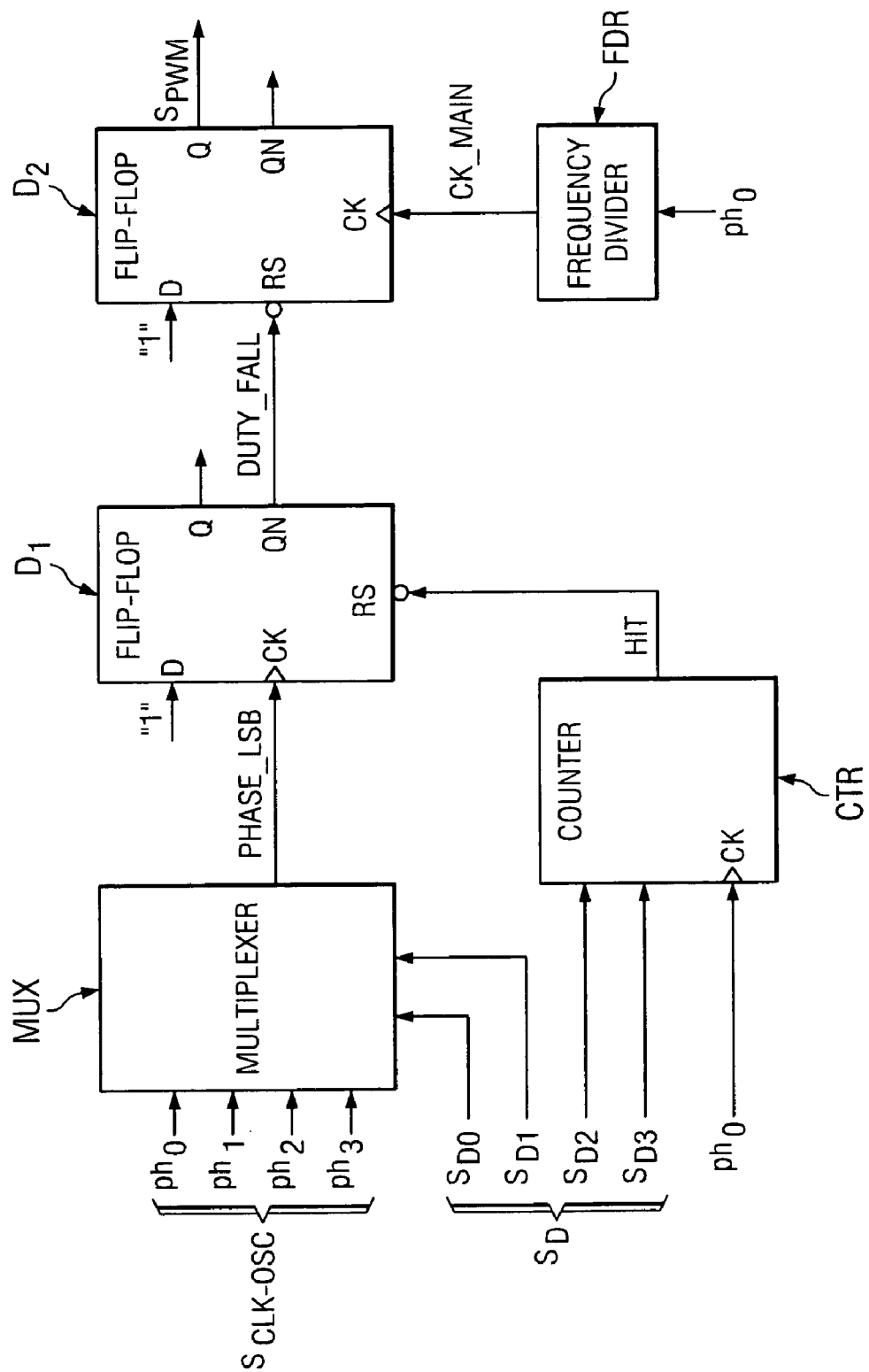
FIG. 5 illustrates a block diagram of portions of a controller including an embodiment of a modulator constructed according to the principles of the present invention.

Turning now to FIG. 5, illustrated is a block diagram of portions of a controller including an embodiment of a modulator constructed according to the principles of the present invention. In the illustrated embodiment, an implementation of an exemplary gate modulator is provided using a four bit digital word representing a digital duty cycle signal $S_D$ provided by a controller (see, for instance, the controller 120 illustrated and described with respect to FIG. 1). For the purposes of an example, the digital word "1001" corresponds to the fourth through the first bits $S_{D3}$, $S_{D2}$, $S_{D1}$, $S_{D0}$, respectively, of the digital duty cycle signal $S_D$. An illustrative two-stage oscillator coupled to the modulator provides multiple phases of a clock signal (such as the clock signal $S_{CLK-OSC}$ illustrated and described with respect to FIG. 1), namely, first, second, third and fourth phases $ph_0$, . . . , $ph_3$.

Thus, a portion (e.g., two bits) of the digital word is employed to select one of the four oscillator phases from the oscillator and represents the least significant bits (also referred to as "LSBs") of the digital word. In the example, the least significant bits are "01," which correspond to the second and first bits $S_{D1}$, $S_{D0}$, respectively, of the digital duty cycle signal $S_D$. The remaining two bits ("10," which correspond to the fourth and third bits $S_{D3}$, $S_{D2}$, respectively, of the digital duty cycle signal $S_D$) represent the most significant bits (also referred to as "MSBs") of the digital word. Of course, the number of bits forming the digital word of the digital duty cycle signal $S_D$ may be different in conjunction with the number of phases of the oscillator and still be within the broad scope of the present invention.

The modulator includes a multiplexer MUX and the first, second, third and fourth phases $ph_0$, . . . , $ph_3$ from the oscillator are supplied thereto. In the illustrated embodiment, the multiplexer MUX is a four-to-one multiplexer that is controlled by the least significant bits (first and second bits $SD_0$, $S_{D1}$ of the digital duty cycle signal $S_D$). The multiplexer MUX provides a multiplexer output signal PHASE_LSB corresponding to the one of the phases $ph_0$, . . . , $ph_3$ selected in accordance with the first and second bits $S_{D0}$, $S_{D1}$ of the digital duty cycle signal $S_D$. For the purposes of the present example, the multiplexer MUX selected the second phase $ph_1$ in accordance with first and second bits $S_{D0}$, $S_{D1}$ of the digital duty cycle signal $S_D$. The multiplexer output signal PHASE_LSB is coupled to a clock input CK of a first flip-flop (e.g., a D flip-flop) $D_1$.

The modulator also includes a counter CTR (e.g., a two-bit counter) having a clock input CK that is coupled to the first phase $ph_0$ provided by the oscillator. The other inputs of the counter CTR are coupled to the most significant bits (third and fourth bits $S_{D2}$, $S_{D3}$) of the digital duty cycle signal $S_D$. The counter CTR counts at a rate set by the first phase $ph_0$ provided to the clock input CK from the oscillator. When the internal count of the counter CTR matches the most signification bits ("10," in this example), the output of the counter CTR provides a high counter output signal HIT. The high counter output signal HIT remains for a period of $(\frac{1}{2}^k)*\Delta T_s$ where k is the number of most significant bits and $\Delta T_s$ is a switching period for a switch of a power converter employing the modulator to advantage. Otherwise, the counter output signal HIT assumes a low state.

The first flip-flop $D_1$ is preferably a rising-edge triggered, negative level, asynchronous reset, D flip-flop ("delay" or "data" flip-flop). The first flip-flop $D_1$ is thus clocked by the rising edge of the phase selected by the least significant bits (first and second bits $S_{D0}$, $S_{D1}$) of the digital duty cycle signal $S_D$. An input D of the first flip-flop $D_1$ is coupled to a high state signal (represented by "1") such as a positive bias voltage source (which may be provided by an internal or external source). A first flip-flop output signal DUTY_FALL from an inverted output QN of the first flip-flop $D_1$ falls as the leading edge of the multiplexer output signal PHASE_LSB present on the clock input CK rises. Furthermore, the first flip-flop output signal DUTY_FALL rises when the counter output signal HIT present on the reset input RS falls.

An input of a frequency divider FDR (e.g., a 4× frequency divider) of the modulator is coupled to the first phase $ph_0$ from the oscillator. For the purposes of this discussion, the frequency divider output signal CK_MAIN is one-quarter of the frequency of the oscillator with a 50% duty. The frequency divider output signal CK_MAIN is coupled to a clock input CK of a second flip-flop (e.g., a D flip-flop) $D_2$ of the modulator with similar switching characteristics to the first flip-flop $D_1$. The first flip-flop output signal DUTY_FALL is coupled to a reset input RS of the second flip-flop $D_2$. An input D of the second flip-flop $D_2$ is coupled to a high state signal (represented by "1") such as a positive bias voltage source (which may be provided by an internal or external source). A non-inverted output Q of the second flip-flop $D_2$ provides or supplies a signal that is typically constructed to form a pulse width modulated signal $S_{PWM}$ to control the duty cycle for at least one switch of a power converter. Thus, the frequency divider output signal CK_MAIN from the frequency divider FDR initiates a rising edge of the pulse width modulated signal $S_{PWM}$ and the first flip-flop output signal DUTY_FALL transitions a falling edge of the pulse width modulated signal $S_{PWM}$. Additionally, the pulse width modulated signal $S_{PWM}$ can be used to directly drive a control terminal of a switch or may be directed via a driver to drive the control terminal of a switch.

Thus, the modulator provides time resolution for an exemplary four-bit signal representing a duty cycle with one-sixteenth precision when the frequency of the oscillator is only four times higher than the switching frequency of the power converter. The additional factor of four in resolution is obtained in the implementation described above by selectively coupling one of the four phases $ph_0$, ... , $ph_3$ of an oscillator to an input of the first flip-flip $D_1$. The pulse width modulated signal $S_{PWM}$ is therefore produced in combination with the most significant bits of the digital duty cycle signal $S_D$ provided to the counter CTR and the least significant bits of the digital duty cycle signal $S_D$ provided to the multiplexer MUX. By employing selected phases $ph_0$, ... , $ph_3$ of an oscillator under the control of the least significant bits of the digital duty cycle signal $S_D$, the modulator can be configured to provide time resolution substantially finer than a frequency of an oscillator.

Figure 6:
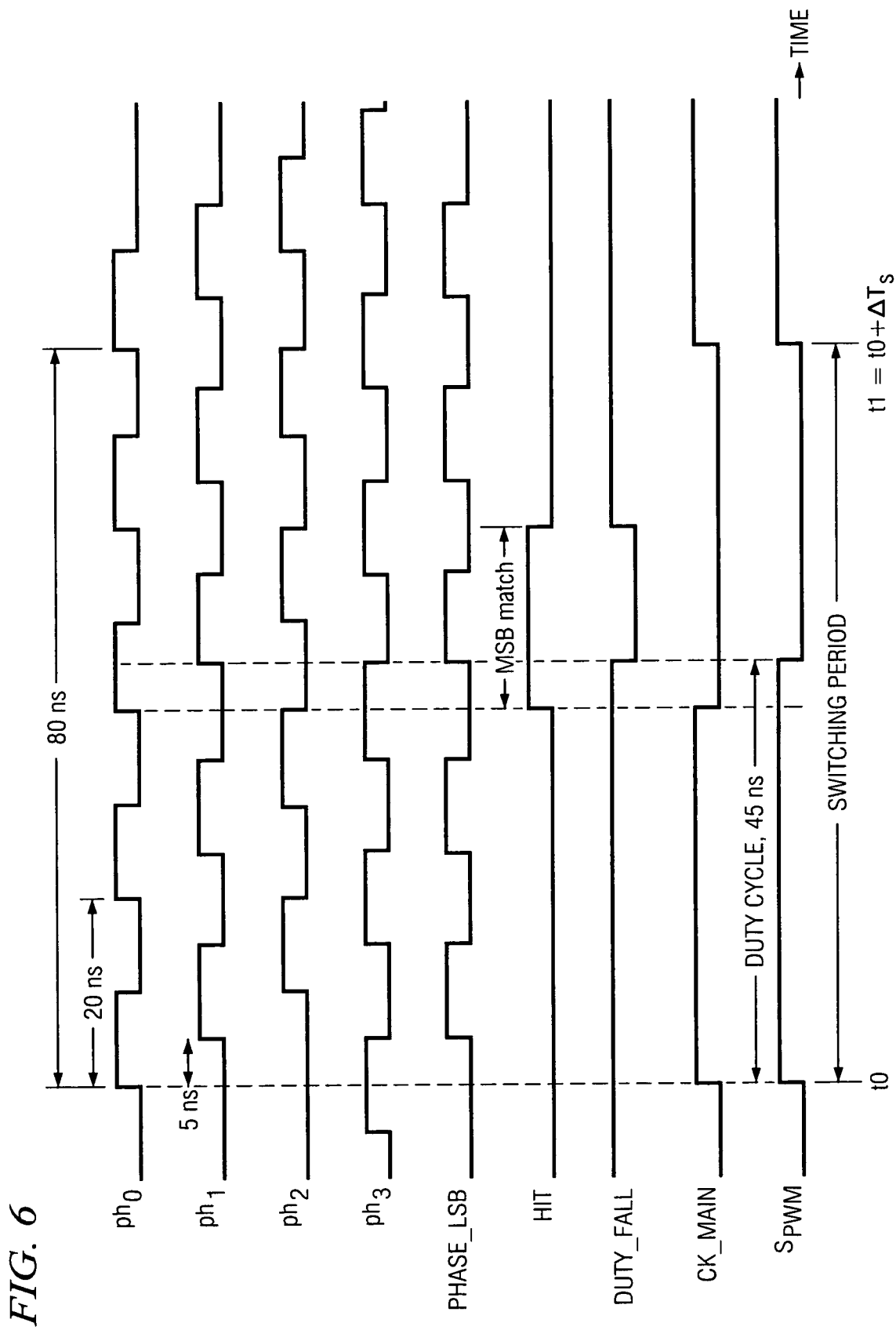
FIG. 6 illustrates a waveform diagram demonstrating an exemplary operation of a modulator in accordance with the principles of the present invention.

Turning now to FIG. 6, illustrated is a waveform diagram demonstrating an exemplary operation of the modulator of FIG. 5. In accordance with the parameters described with respect to FIG. 5, an exemplary operation of the modulator is provided using a four bit digital word representing a digital duty cycle signal $S_D$ provided by a controller (see, for instance, the controller 120 illustrated and described with respect to FIG. 1). Also, a common time base is used for the waveforms. The first four waveforms represent the first, second, third and fourth phases $ph_0$, ... , $ph_3$ of a clock signal (such as the clock signal $S_{CLK-OSC}$ illustrated and described with respect to FIG. 1) from an oscillator. The waveforms of the first, second, third and fourth phases $ph_0$, ... , $ph_3$ are periodic and displaced 90 degrees in phase from the previous phase.

With respect to the multiplexer MUX, the multiplexer output signal PHASE_LSB selects the second phase phi in accordance with first and second bits $S_{D0}$, $S_{D1}$ of the digital duty cycle signal $S_D$. When the internal count of the counter CTR matches the most signification bits ("10," in this example), the output of the counter CTR provides a high counter output signal HIT for one-quarter of a switching period. A falling edge of the first flip-flop output signal DUTY_FALL is substantially aligned with a rising edge of the multiplexer output signal PHASE_LSB and a rising edge of the first flip-flop output signal DUTY_FALL is substantially aligned with a falling edge of the counter output signal HIT. The frequency divider output signal CK_MAIN is illustrated with a 50% duty cycle. The pulse width modulated signal $S_{PWM}$ represents a time-based signal that can be coupled to control the duty cycle for at least one switch of a power converter. In an exemplary embodiment, the switching period of the power converter is 80 nanoseconds, the pulse width modulated signal $S_{PWM}$ is 45 nanoseconds and the digital word (e.g., "1001") corresponds to the fourth through the first bits $S_{D3}$, $S_{D2}$, $S_{D1}$, $S_{D0}$, respectively, of the digital duty cycle signal $S_D$.

The preceding exemplary embodiment is an illustration of trailing edge modulation under control of the least and most significant bits of the digital duty cycle signal $S_D$. Those skilled in the art should understand that other modulation techniques such as leading edge modulation, or combinations of different techniques, are well within the broad scope of the present invention.

Additionally, for the purposes of simplicity, the modulator was previously described employing a four bit digital duty cycle signal $S_D$. As mentioned above, the digital duty cycle signal $S_D$ may be embodied in any number of bits and, very practically, the digital duty cycle signal $S_D$ may be embodied in eight bits. In such a case, the digital duty cycle signal $S_D$ may be partitioned with five most significant bits and three least significant bits. Employing a design analogous to the modulator described above, the five most significant bits control a five bit counter that contributes to creating a portion of the duty cycle embodied in the pulse width modulated signal. A ring oscillator provides eight substantially equally delayed signals representing eight oscillator phases, selectable by the three least significant bits of the digital duty cycle signal thereby refining a resolution of the duty cycle embodied in the pulse width modulated signal. A frequency divider, in an exemplary embodiment, is a 32:1 frequency divider that supplies a signal to initiate an edge of the pulse width modulated signal including the duty cycle.

Assuming that the power converter described above is operating at a switching frequency of five megahertz and a frequency of a corresponding oscillator is 160 megahertz (32 times higher than the switching frequency of the power converter), a time resolution of the duty cycle can be significantly refined. More particularly, with the three least significant bits selecting a phase of an oscillator (e.g., for an oscillator that provides eight phases), a time resolution of approximately 0.8 nanoseconds can be achieved. Without partitioning the digital duty cycle signal as described above and not employing the least significant bits to select specific phases of the oscillator, an oscillator frequency of 1.28 gigahertz would be required in lieu of the 160 megahertz oscillator to obtain the same time resolution in duty cycle in accordance with the principles of the present invention.

Thus, a controller for, and related method of, controlling a duty cycle for at least one switch of a power converter with readily attainable and quantifiable advantages has been introduced. Those skilled in the art should understand tat the previously described embodiments of the controller, related method, and power converter employing the same are submitted for illustrative purposes only and that other embodiments capable of producing a time-based signal representing a duty cycle for a power converter from a digital word and multiple phases of an oscillator are well within the broad scope of the present invention. Additionally, in an advantageous embodiment, a power converter constructed according to the principles of the present invention may be embodied in an integrated circuit Alternatively, portions of the power converter such as the controller and the power train (or portions thereof) may also be embodied in an integrated circuit and still be within the broad scope of the present invention. In accordance therewith, selected switches or other devices of the power converter may be embodied in a semiconductor device as disclosed in U.S. Patent Application Publication No. 2005/0167756, entitled "Laterally Diffused Metal Oxide Semiconductor Device and Method of Forming the Same," to Lofti, et al., which is incorporated herein by reference.

The controller includes a modulator that converts a signal in the form of a digital word representing a duty cycle for a switch into a signal with a high degree of temporal resolution by employing multiple phases of an oscillator. As a result, the power converter can employ an oscillator operating at a reasonable frequency and can meet the needs of high performance power converters with low cost and small board area.

Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power converter topologies. While the controller has been described in the environment of a power converter, those skilled in the art should understand that the controller and related principles of the present invention may be applied in other environments or applications such as a power amplifier, motor controller, and a system to control an actuator in accordance with a stepper motor or other electromechanical device.

For a better understanding of digital control theory in power converters see "An Energy/Security Scalable Encryption Processor Using an Embedded Variable Voltage DC/DC Converter," by John Goodman, Abram P. Dancy and Anantha P. Chandrakasan, IEEE Journal of Solid-State Circuits, Vol. 33, No. 11 (November 1998). For a better understanding of power converters, see "Modern DC-to-DC Switchmode Power Converter Circuits," by Rudolph P. Sevems and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Although the present invention has been described in detail, those skilled in the art should understand that they can make various changes, substitutions and alterations herein without departing from the spirit and scope of the invention in its broadest form.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller for use with a power train of a power converter including a switch configured to conduct for a duty cycle, comprising:
    an oscillator configured to provide a clock signal having multiple phases; and
    a modulator configured to select a phase of said clock signal as a function of a portion of a digital duty cycle signal to refine a resolution of said duty cycle and provide a signal to control said duty cycle of said switch as a function of said digital duty cycle signal.

2. The controller as recited in claim 1 wherein said modulator is configured to provide a pulse width modulated signal to control said duty cycle of said switch.

3. The controller as recited in claim 1 wherein said digital duty cycle signal includes least and most significant bits, said modulator being configured to select said phase of said clock signal as a function of said least significant bits of said digital duty cycle signal to refine said resolution of said duty cycle.

4. The controller as recited in claim 1 wherein said digital duty cycle signal includes least and most significant bits, said modulator being configured to provide said signal to control said duty cycle of said switch as a function of said least and most significant bits of said digital duty cycle signal.

5. The controller as recited in claim 1 wherein said oscillator is a ring oscillator.

6. The controller as recited in claim 1 wherein said modulator comprises a multiplexer, a counter, at least one flip-flop and a frequency divider.

7. The controller as recited in claim 1 further comprising a duty cycle processor configured to provide said digital duty cycle signal.

8. A method of controlling a duty cycle of a switch of a power train of a power converter, comprising:
  providing a clock signal having multiple phases;
  selecting a phase of said clock signal as a function of a portion of a digital duty cycle signal to refine a resolution of said duty cycle; and
  supplying a signal to control said duty cycle of said switch as a function of said digital duty cycle signal.

9. The method as recited in claim 8 wherein said supplying comprises supplying a pulse width modulated signal to control said duty cycle of said switch.

10. The method as recited in claim 8 wherein said digital duty cycle signal includes least and most significant bits, said selecting comprising selecting said phase of said clock signal as a function of said least significant bits of said digital duty cycle signal to refine said resolution of said duty cycle.

11. The method as recited in claim 8 wherein said digital duty cycle signal includes least and most significant bits, said supplying comprising supplying said signal to control said duty cycle of said switch as a function of said least and most significant bits of said digital duty cycle signal.

12. The method as recited in claim 8 wherein said providing is performed by a ring oscillator.

13. The method as recited in claim 8 wherein said digital duty cycle signal includes least and most significant bits, said supplying employing trailing edge modulation of said digital duty cycle signal in accordance with said least and most significant bits to derive said signal to control said duty cycle of said switch.

14. The method as recited in claim 8 further comprising furnishing said digital duty cycle signal prior to said act of selecting.

15. A power converter, comprising:
  a power train including a switch configured to conduct for a duty cycle and provide a regulated output characteristic at an output of said power converter; and
  a controller, including:
    an oscillator configured to provide a clock signal having multiple phases; and
    a modulator configured to select a phase of said clock signal as a function of a portion of a digital duty cycle signal to refine a resolution of said duty cycle and provide a signal to control said duty cycle of said switch as a function of said digital duty cycle signal.

16. The power converter as recited in claim 15 wherein said modulator is configured to provide a pulse width modulated signal to control said duty cycle of said switch.

17. The power converter as recited in claim 15 wherein said digital duty cycle signal includes least and most significant bits, said modulator being configured to select said phase of said clock signal as a function of said least significant bits of said digital duty cycle signal to refine said resolution of said duty cycle, said modulator further being configured to provide said signal to control said duty cycle of said switch as a function of said least and most significant bits of said digital duty cycle signal.

18. The power converter as recited in claim 15 wherein said oscillator is a ring oscillator.

19. The power converter as recited in claim 15 wherein said modulator comprises a multiplexer, a counter, at least one flip-flop and a frequency divider.

20. The power converter as recited in claim 15 wherein said controller further comprises a duty cycle processor configured to provide said digital duty cycle signal and said power converter further comprises a driver configured to provide a drive signal to said switch based on said signal provided by said modulator.

* * * * *